(12) United States Patent
Burley

(10) Patent No.: US 6,530,332 B2
(45) Date of Patent: Mar. 11, 2003

(54) AGRICULTURAL EARTH WORKING APPARATUS

(76) Inventor: Blaine F. Burley, 311 N. Marcus St., Wrightsville, GA (US) 31096

( * ) Notice: Subject to any disclaimer, the term of this patent is extended or adjusted under 35 U.S.C. 154(b) by 0 days.

(21) Appl. No.: 09/897,342

(22) Filed: Jul. 2, 2001

(65) Prior Publication Data

US 2002/0043193 A1 Apr. 18, 2002

Related U.S. Application Data

(60) Provisional application No. 60/219,000, filed on Jul. 17, 2000.

(51) Int. Cl.$^7$ ............................................. A01C 15/00
(52) U.S. Cl. ..................... 111/52; 172/668; 172/452; 172/695
(58) Field of Search .................................. 172/687, 668, 172/677, 694, 695, 685, 452; 111/52, 69, 73, 77, 925, 80, 81

(56) References Cited

U.S. PATENT DOCUMENTS

| | | | |
|---|---|---|---|
| 556,551 A | | 3/1896 | McKee |
| 2,189,962 A | * | 2/1940 | Rae et al. |
| 2,739,549 A | | 3/1956 | Taylor |
| 3,117,541 A | | 1/1964 | Todd et al. |
| 3,122,111 A | | 2/1964 | Taylor, Sr. |
| 3,220,370 A | | 11/1965 | Smith |
| 3,673,970 A | | 7/1972 | Hatcher |
| 3,797,418 A | | 3/1974 | Bridger, Jr. |
| 3,841,529 A | | 10/1974 | Hatcher |
| 3,912,019 A | * | 10/1975 | Baughman et al. |
| 4,055,126 A | | 10/1977 | Brown et al. |
| 4,070,974 A | | 1/1978 | Stacy, Jr. |
| 4,230,054 A | | 10/1980 | Hatcher |
| 4,241,674 A | | 12/1980 | Mellinger |
| 4,250,970 A | * | 2/1981 | Pfenninger et al. |
| 4,726,303 A | | 2/1988 | Degelman et al. |
| 4,903,782 A | * | 2/1990 | McClellan |
| 5,535,832 A | * | 7/1996 | Benoit |
| 5,622,227 A | * | 4/1997 | McDonald |
| 5,746,275 A | * | 5/1998 | Cross et al. |
| 5,829,536 A | * | 11/1998 | Pigg et al. |
| 5,988,293 A | * | 11/1999 | Brueggen et al. |

* cited by examiner

*Primary Examiner*—Victor Batson
(74) *Attorney, Agent, or Firm*—Hinkle & O'Bradovich, LLC

(57) ABSTRACT

An earth working apparatus is disclosed. The apparatus generally includes a frame, a harrow cultivator connected to the frame and adapted to be angled and adjusted for height with respect to the frame, a plow cultivator connected to the frame and adapted to be adjusted for height, a seed and fertilizer dispensing hopper connected to the frame, a drag and compactor device connected to the frame, a height adjustment for setting the soil depth of the harrow cultivator and plow cultivator and an adjustable one-point hitch attachment. The apparatus is adapted to be attached to a wide variety of prime movers.

10 Claims, 4 Drawing Sheets

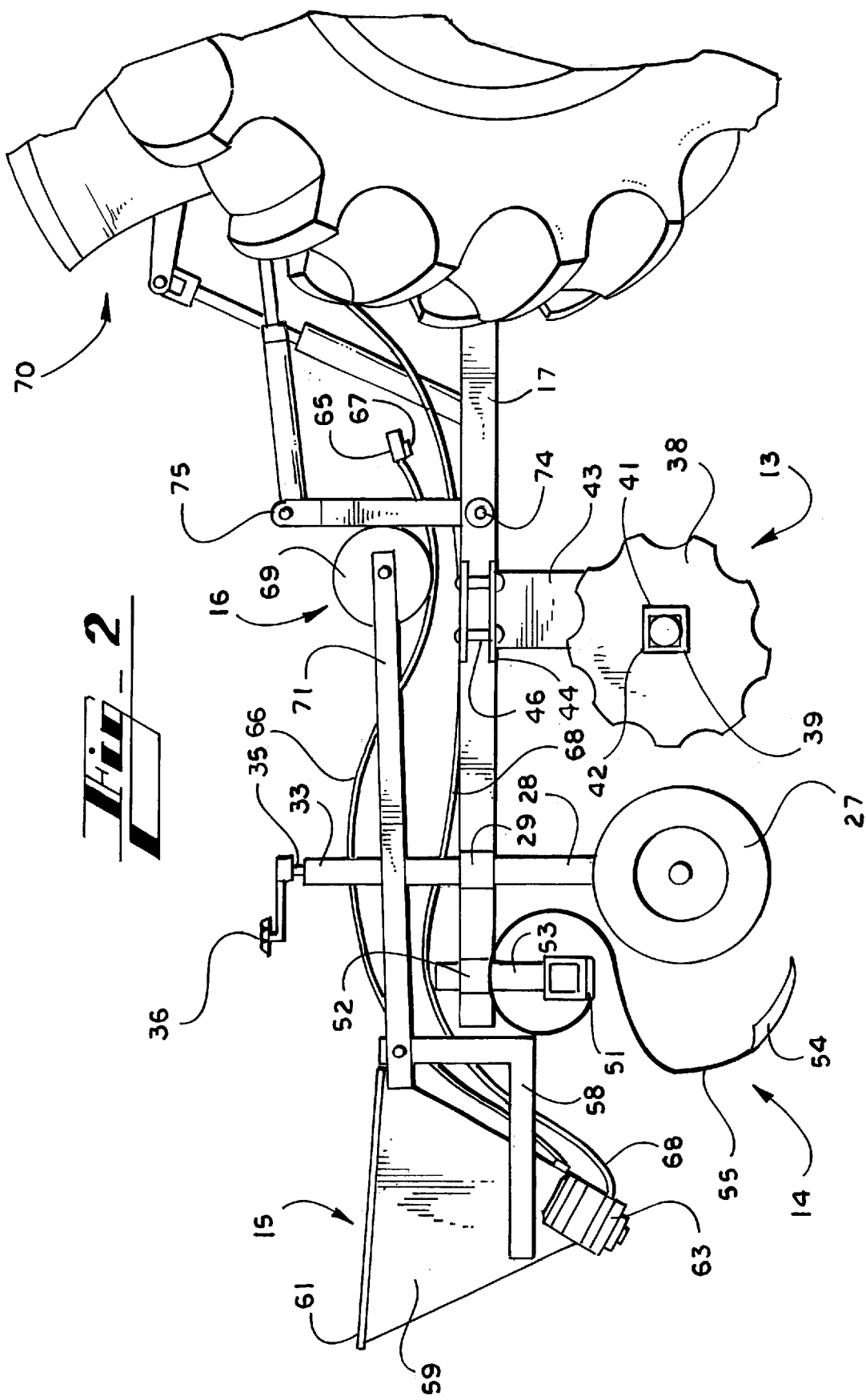

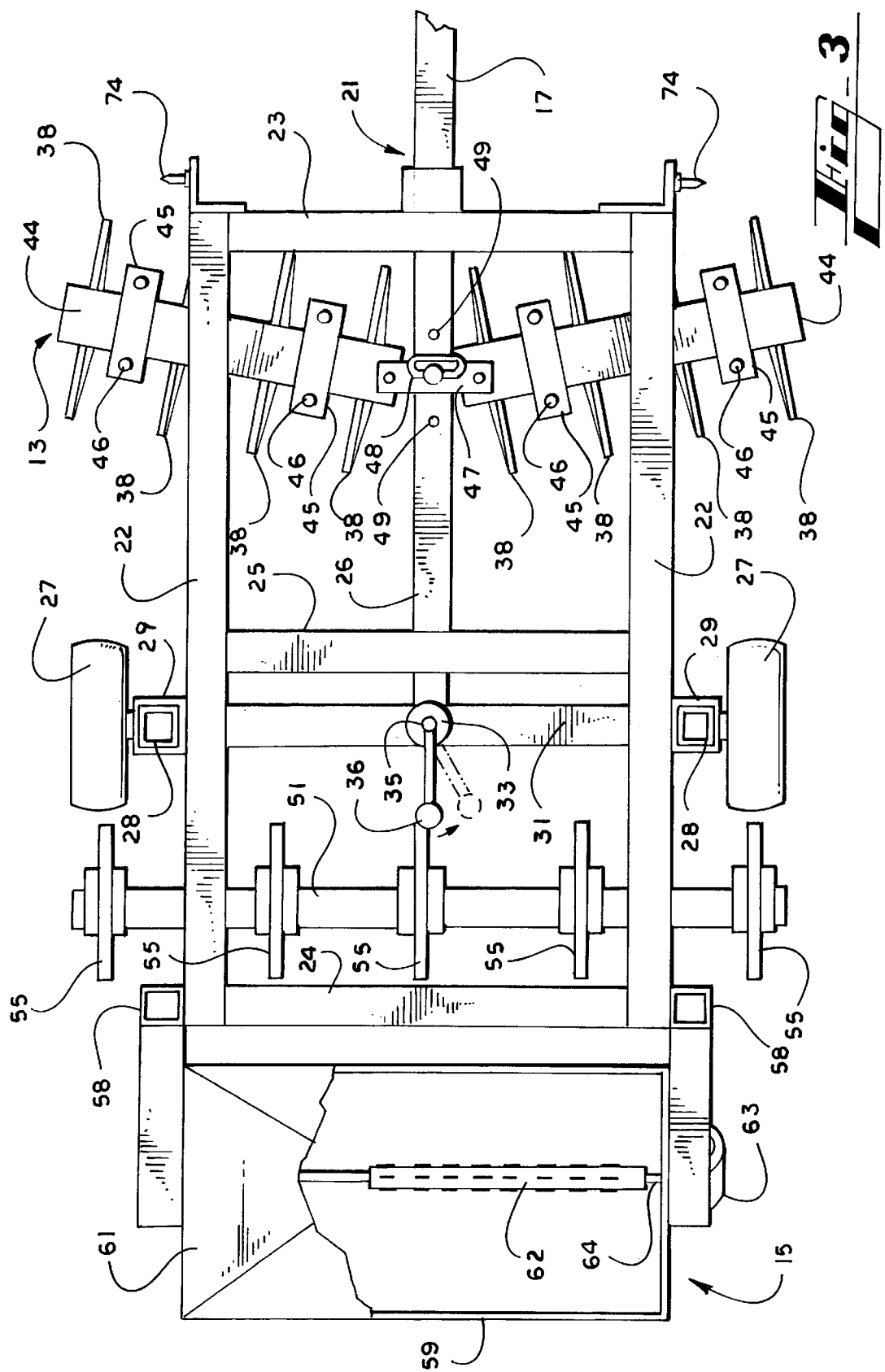

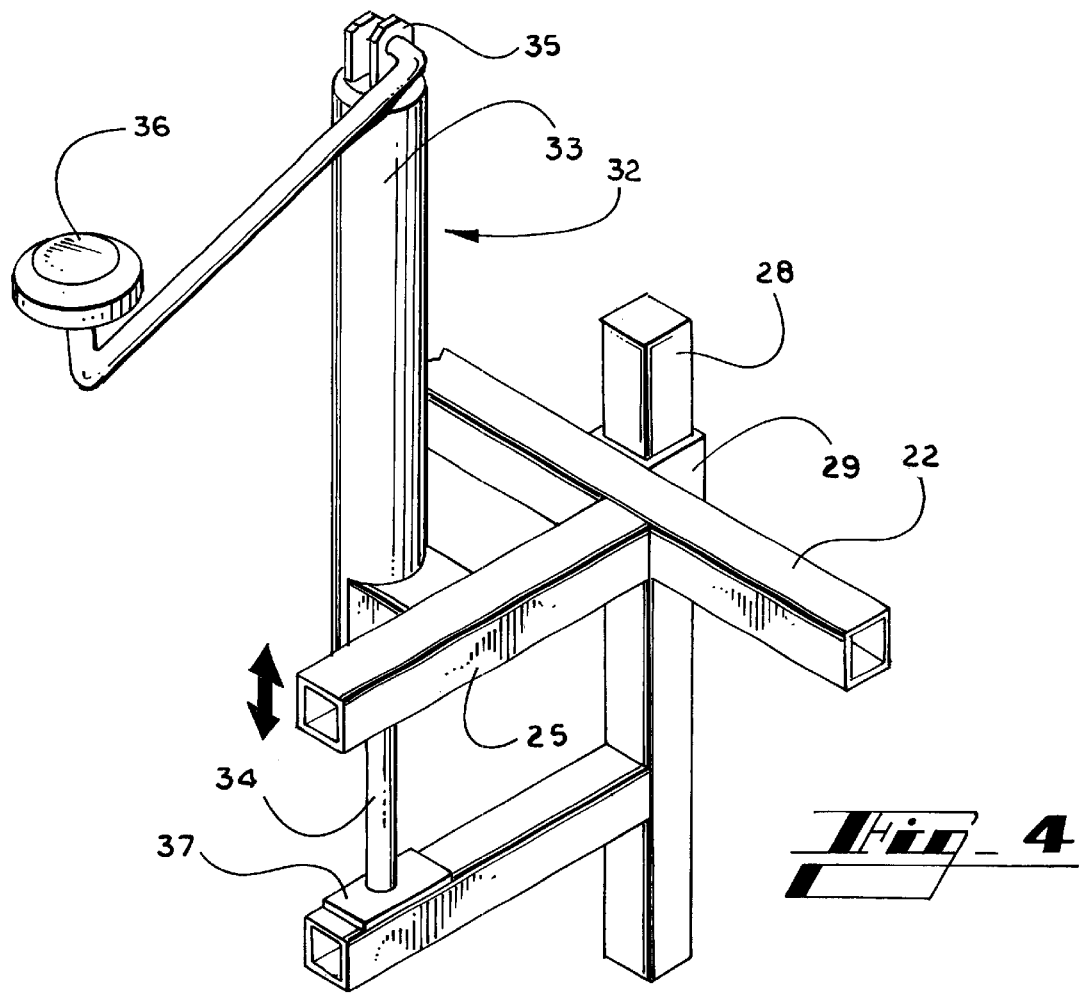
Fig_4
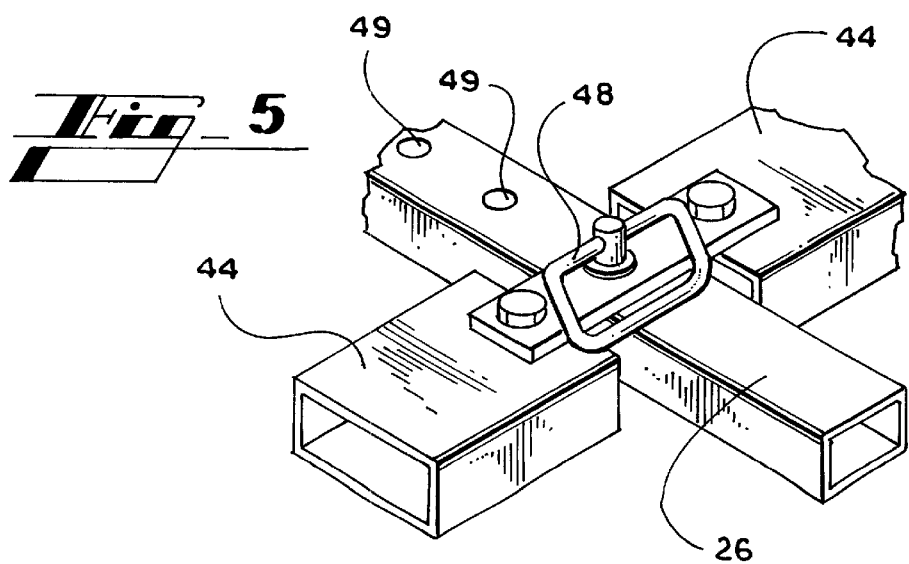
Fig_5

AGRICULTURAL EARTH WORKING APPARATUS

CROSS-REFERENCE TO RELATED APPLICATIONS

This application claims the priority benefit of U.S. Provisional Application No. 60/219,000, filed Jul. 17, 2000, entitled, "Agricultural Earth Working Apparatus".

BACKGROUND OF THE INVENTION

I. Field of the Invention

The present invention relates generally to the field of earth working implements, and more particularly to multi-use earth working implements which are capable of being utilized on small plots of land and can be moved by a wide variety of prime movers, such as small tractors, all terrain vehicles (ATV's), trucks, horses, mules or oxen, and wherein the plot of ground can be fully tilled and planted in a single pass of the implement.

II. Description of the Related Art

In a typical farming environment, land is generally tilled or cultivated by machines which are dedicated to a single process. For instance, if one wishes to plow a field, the usual process is to have a tractor pull a plow, or a gang of plows, behind the tractor to effect the tilling. However, this does not end the cultivating of the soil, nor does it affect planting. To properly cultivate a field, it is generally necessary to till the soil with multiple implements in multiple passes with the tractor.

Various forms of multi-use earth working implements have been devised, but they are not adequate for the above-mentioned needs. Typically, the prior art devices failed to have attachments and features which perform the necessary tasks to fully and completely till, cultivate and plant a plot of land in one pass of the implement.

An implement which is typical of the prior art is the patent to Hatcher (U.S. Pat. No. 3,673,970) showing a frame with a hitch to a prime mover and which has various implements attached thereto for cultivation and planting. However, this patent fails to have the complete array of attachments of the present invention and does not have the specific control features for the attachments which are provided herein. This patent also fails to provide the capability of being pulled by many different types of prime movers as provided by the present invention.

SUMMARY OF THE INVENTION

In accordance with the present invention and the contemplated problems which have and continue to exist in this field, the present invention generally provides a multi-use implement that can be used to plant relatively small food plots using small prime movers such as garden tractors, all terrain vehicles, light trucks, mules, horses or oxen. The apparatus of this invention is pulled behind the prime mover with either a one point hitch for use with ATV's or small garden tractors and the like, or the included three point hitch may be utilized with small tractors, mules, horses or oxen. The apparatus has a frame to which is attached various cultivating and tilling apparatus such as a disk harrow to disk up the soil, a gang of plows to cultivate the soil, a seeding apparatus to plant seed or to spread fertilizer, a combination drag and compactor by which the seed may be covered, and to compact the soil. All of these attachments are capable of being adjusted quite easily and/or operated by the prime mover operator from a remote location.

In general in one aspect, the invention features an agricultural device, including a frame having two substantially parallel side bars, a longitudinal bar substantially parallel to the side bars and a rear bar substantially perpendicular to the side bars and the longitudinal bar, tillage tools connected to the frame and agricultural tools connected to the frame.

In an implementation, the tillage tools include a disk harrow cultivator, including a bifurcated angle adjustment bar wherein a first end of each piece of the adjustment bar is adjustably connected to the longitudinal bar, and wherein a second end of each piece of the adjustment bar protrudes through a respective side bar and a plurality of disks connected to the adjustment bar, wherein the bifurcated angle can be adjusted along the longitudinal bar.

In another implementation, the tillage tools include a plow cultivator including a height adjustment bar connected to the rear bar, at least one tine connected to the height adjustment bar and plow heads respectively connected to the tines.

In another implementation, the agricultural tools include a hopper including a bin having an opening, an agitator connected to the bin, plates adapted to open and close the opening and an manual opening adjustment connected to the plates.

In another implementation, the agricultural tools include a compactor including arms connected to the frame, a roller rotatably connected to the arms and at least one resilient member connected to the arms and the frame.

In still another implementation, the device includes an adjustable one point hitch as well as a three point hitch.

In yet another implementation, the device includes an adjustable height device connected to the frame the device adapted to adjust the soil depth of the tillage tools, the device being a manual jack or a motorized jack.

In another implementation, the device includes transport wheels connected to the frame.

In another aspect, the invention features an earth working apparatus, including a frame, a harrow cultivator connected to the frame and adapted to be angled and adjusted for height with respect to the frame, a plow cultivator connected to the frame and adapted to be adjusted for height, a seed and fertilizer dispensing hopper connected to the frame, a drag and compactor device connected to the frame, a height adjustment for setting the soil depth of the harrow cultivator and plow cultivator and a hitch attachment height adjustment device.

In still another aspect, the invention features an agricultural system, including a prime mover, an agricultural device connected to the prime mover, the device including a frame, a harrow cultivator connected to the frame and adapted to be angled and adjusted for height with respect to the frame, a plow cultivator connected to the frame and adapted to be adjusted for height, a seed and fertilizer dispensing hopper connected to the frame, a drag and compactor device connected to the frame, a height adjustment for setting the soil depth of the harrow cultivator and plow cultivator and a hitch attachment height adjustment device.

In an implementation, the prime mover can be a tractor, truck, mule, horse, oxen or an ATV.

By using the present invention, one can plant a food plot in a single pass using a single piece of equipment rather than using multiple implements and making multiple passes along the land to be cultivated. Due to its small and compact design, the invention can easily be transported from place to place and can be used to plant plots in hard to get to places.

The angle of cut of the disk harrow is quite easily changed by moving one clevis pin member while the depth of cut of both the disk harrow and the plow is varied by a jack screw system, which can be both manually or electrically operated, to vary the height of the wheels with respect to the implements. The compactor attachment is adjustable so that it may be utilized as a compactor to roll out the cultivated earth, or it may be swung over the frame of the apparatus to add additional weight to the cutting process. The seeding attachment has an agitator which is manually or electrically operated which may be controlled remotely by the operator of the prime mover.

Other objects, advantages and capabilities of the invention will become apparent from the following description taken in conjunction with the accompanying drawings showing the preferred embodiment of the invention.

BRIEF DESCRIPTION OF THE DRAWINGS

FIG. 2 is a right side elevation view;

FIG. 3 is a top plan view, showing the cover of the seeding attachment partially broken away to illustrate an agitator;

FIG. 4 is a partial perspective view of the jack screw for adjusting the height of the apparatus from the ground; and FIG. 5 is a partial top perspective view of the clevis pin adjustment of the disk harrow.

DETAILED DESCRIPTION OF THE INVENTION

Figure 1:
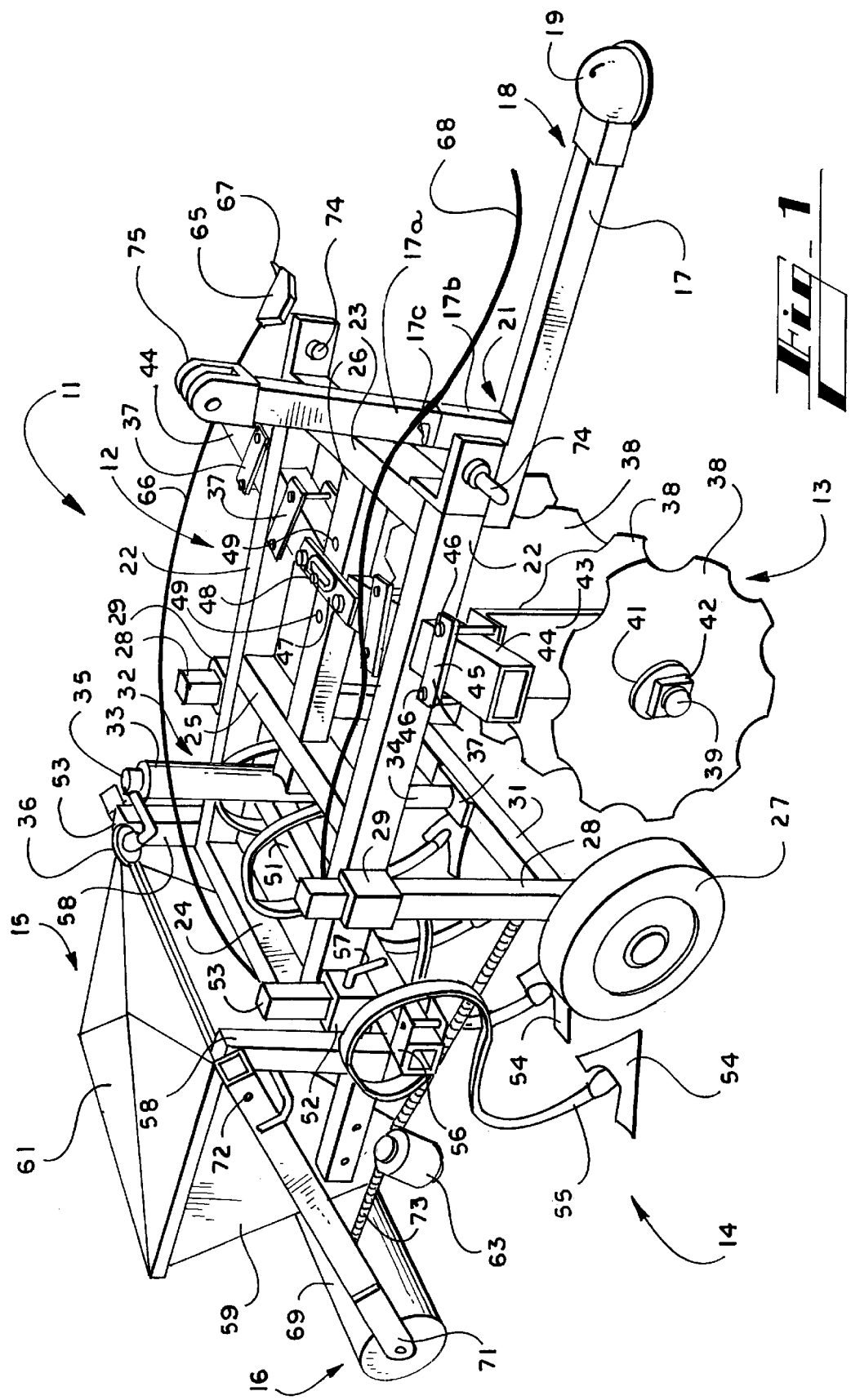
FIG. 1 is an overall perspective view of one embodiment of an agricultural earth working apparatus.

Referring to the drawings wherein like reference numerals designate corresponding parts throughout the several figures, reference is made first to FIGS. 1 and 3. The agricultural earth working apparatus 11 of the present invention generally comprises a wheeled frame 12, and tillage attachments comprising a disk harrow cultivator 13 and a plow cultivator 14. In addition, there is a seed and fertilizer dispensing hopper 15, and a combination drag and compactor attachment 16.

The wheeled frame 12 is the portion of the apparatus to which all of the implements are attached. Generally, the frame 12 includes a draw bar 17 having a distal end 18 to which is attached a coupling hitch 19 of standard design adapted to engage a coupling ball (not shown) on the prime mover. At the proximal end 21 of the draw bar 17, a generally rectangular frame is shown comprising side frame members 22, front frame member 23 disposed between the forward ends of the side frame members 22 and a rear frame member 24 disposed at the rearward ends of the side frame members 22. To give added rigidity and support, a generally centrally located mid frame cross member 25 is positioned between the side frame members 22 and has attached between it and front frame member 23, a mid frame longitudinal member 26. Typically, the frame members, including the draw bar, will all be made of consistently sized steel and will typically be a two inch by two inch (2"×2") box beam.

The one point hitch is adjustable for differing heights of the coupling ball of prime movers by an adjustment mechanism incorporated in the draw bar 17 and the three point upright 17a. The three point upright 17a has a capability of telescopingly engaging tube 17b thereinto and locking the tube 17b at differing positions by an inserted clevis pin 17c. Generally, this is used to adjust the angle of attack of the disks 13, plows 14 and compactor 16 to allow a more or less aggressive cut.

For traveling purposes in moving the apparatus 11 from job site to job site and for adjusting the depth of cut of the harrow 13 and plow 14, the frame 12 has attached to it vertically adjustable wheels 27 rotatably connected to respective vertical support adjustment bars 28 which are slidably engaged with vertical adjustment support members 29, which are affixed to respective side frame members 22. For adjustment purposes and to add rigidity to the vertical support adjustment bars 28, there is provided an axle support bar 31 which interconnects each adjustment bar 28 in order to maintain the desired spacing between wheels 27 and to maintain the adjustment bars 28 in a true vertical condition with respect to the frame 12. As is evident, the adjustment bars 28 are designed for reciprocative movement within the adjustment support members 29 and such is accomplished by an adjusting jack 32. FIG. 4 illustrates a blown up perspective view of the jack 32. The jack 32 includes a jack cylinder 33 fixedly attached to the mid frame longitudinal member 26, and has telescopingly mounted therein a jack screw tube 34 which reciprocates into and out of the jack cylinder 33 upon application of turning movement to the jack screw rod 35 by means of the jack handle 36. The distal end 37 of the jack screw tube 34 is attached to the upper surface of the axle support bar 31 so that upon application of the rotative movement to the jack screw rod 35, the jack screw tube 34 is moved upwardly or downwardly, as the case may be, thereby moving the wheels 27 to space the wheels from the wheeled frame a desired distance to engage the disk harrow cultivator 13, or the plow cultivator 14, to a desired depth in the soil. The plow cultivator 14 may be additionally adjusted in depth in the soil by a mechanism yet to be described. It should be noted that the adjustment jack 32, while shown in the drawings as a manually operated mechanism, could easily have an electric motor attached to the jack screw rod 35, as opposed to the jack handle 36, to make the jack 32 electrically operated by the driver of the prime mover.

The first attachment rearward of the front frame member 23 is the disk harrow cultivator 13. The disk cultivator 13 generally comprises a plurality of disks 38 rotatably attached to axles 39 by hub 41 and a fastener 42. The axle 39 is suitably attached to a disk axle support bracket 43 which is, in turn, attached to the disk harrow cultivator attachment hanger bar 44 by suitable attaching members 45 and the associated attaching hardware 46. As is seen in FIG. 1, there are a plurality of disks 38 and associated disk mounting mechanisms as just described. Each of the disks 38 are attached to the hanger bar 44 which is bifurcated at the mid section thereof. FIG. 5 illustrates a blown up perspective view of the bars 44. Each end of the mid section of the respective hanger bars 44 are attached to an angle adjusting plate 47, there being one plate 47 on the upper surface of the hanger bars 44 and one plate 47 on the lower surface of each hanger bar 44. In this manner, the angle adjustment plates sandwich the mid frame longitudinal member 26 and maintains the hanger bars 44 closely adjacent thereto. The distal ends of each hanger bar project through a suitable opening in side frames 22 wherein the openings are of such size as to allow limited fore and aft movement of the hanger bars 44 at desired times. As it is necessary to adjust the angle of attack of the disks 38 with respect to the soil, the movement of hanger bars 44 by positioning angle adjustment plates 47, forwardly or rearwardly, will effect the desired result. For instance, in FIG. 1, the mid frame longitudinal member 26 is shown with three apertures therein and these apertures are utilized by placing a clevis pin 48 through an aperture in the angle adjustment plate 47, and thence through matching aligned holes in the longitudinal member 26, and thence through the lower angle adjustment plate 47. Once the clevis pin 48 is properly positioned, the angle of attack of the disks with respect to the soil is fixed. Should the angle of attack need to be changed, then it is merely necessary to clevis pin 48 and place it in one of the adjacent apertures 49 in the longitudinal member 26. In this manner, the proximal ends of the hanger bars 44 may be swung to varying positions along the longitudinal member 26, thereby varying the angle of attack of each of the disks 38. In this manner, a very sturdy and strong construction is given to the disk harrow cultivator 13, wherein all necessary portions are strongly engaged with the wheeled frame 12.

Rearwardly of the wheels 27 is mounted the plow cultivator 14, which comprises a vertically adjustable plow support bar 51 having opposed vertical adjustment support member 52 mounted to respective sides of the side frame members 22. Within the vertical adjustment support members 52 are placed respective vertical plow adjustment bars 53 which are fixedly attached to the plow support bar 51. In this manner the entire plow support bar 51 may be raised or lowered, as the case may be, to give a fine adjustment to the depth of cut of each plow head 54. As is noted, each plow head 54 is attached to an S-shaped tine 55 which is, in turn, mounted with attaching member 56 to the plow support bar 51. Since it is not necessary to vary the angle of attack of the plow heads 54 with respect to the longitudinal direction of the wheeled frame 12, there has been no provision made for rotatably mounting the plow support bar 51 with respect to the wheel to frame 12. However, such could be accomplished in the same manner as the disk harrow cultivator 13 if the occasion should rise. In order to maintain the plow support bar 51 in its intended height with respect to the soil, the adjustment bars 53 are locked within the adjustment support members 52 by means of a twistable locking bar 57 mounted through a side wall of each of the adjustment support members 52.

Mounted rearwardly of the plow cultivator attachment 14 is the seed/fertilizer dispensing hopper 15 which is fixed to the hopper support members 58 that are attached to the side frame members 22. The hopper 15 comprises a bin 59 having a top 61 to enclose the bin and, referring to FIG. 3, a transversely mounted agitator 62 located in the bottom portion of the bin 59 for the purpose of maintaining agitation in the materials to be dispensed therefrom. The agitation 62 is suitably rotatably mounted within the bin 59 and, at one end thereof, has an electric motor 63 attached to the agitator axle 64 in order to rotate the agitator at desired times to dispense through the bottom of the bin the seed and/or fertilizer, as the case may be. The bottom of the agitator has a conventional sliding plate (not shown) for closing the openings in the bottom of the bin to restrict the flow of materials therethrough. The operator of the prime mover will typically control the sliding plate at the bottom of the bin which restricts the flow of the materials therethrough by means of a hopper opening controller mechanism 65, which would be mounted at the prime mover in a convenient location. Typically, there would be a cable member 66 interconnecting the controller 65 and the sliding plate at the bottom of the bin 59. By moving the adjustment knob 67, the operator controls the slide opening plate to any position between a fully opened and a fully closed position, thereby restricting the flow of materials as necessary. The electric motor 63 has its electrical energy supplied through an electric cable 68 which is connected to the electrical portion of the prime mover, thereby allowing the operator to control the motor at times when material is to be dispensed from the hopper 15.

Also attached to the hopper support members 58 is a compactor 69, which also can act as a drag bar if necessary, and includes compactor support arms 71 flanking the sides of bin 59, wherein each flanking arm is attached to one of the hopper supports 58 at one end thereof, and at the other end thereof a compactor roller 69 is rotatably attached. Typically, the compactor roller is a hollow drum which has an opening therein for the purpose of filling with water, or other like substance, in order to give the compactor suitable weight to roll or otherwise engage the soil as necessary. Should it be necessary to place additional weight upon the wheeled frame 12, the compactor 69 can be rotated upwardly and forwardly around pivot points 72 so that the compactor will be placed centrally over the wheeled frame 12 in order that the weight thereof would press downwardly upon the wheeled frame and the various cultivating attachments. In order to maintain the compactor in a ground engaging position when the apparatus 11 is moving across the ground, a plurality of heavy duty springs and accompanying chain links 73 are attached between the vertical support adjustment bars 28 and the compactor support arms 71. The spring action will then maintain the compactor in ground engagement, yet allow enough flexibility to permit the compactor to roll over high spots as they may occur. The springs and accompanying chain links 73 will also maintain, if adjusted properly, the compactor with enough ground pressure to compact the soil.

As is seen in FIG. 2, the apparatus 11 is capable of having a three point hitch engagement with a typical farm tractor 70, wherein the three point hitch mechanism of the tractor engages the apparatus 11 at a pair of three point hitch pins 74 and at the three point hitch yolk 75 in the normal manner. As previously discussed, if the prime mover is not a typical farm type tractor with a three point hitch, an adjustable one point hitch which consists of a draw bar 17 with a coupler 19 may be attached to a standard ball hitch arrangement. Also, in FIG. 2, the apparatus 11 is being depicted with the compactor 69 in its folded forward position as opposed to the ground engaging position. The compactor in its folded forward position is used to add additional weight over the cultivating and/or tillage attachments for improved tillage of soil.

Therefore, the foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What is claimed is:

1. An agricultural device, comprising:
    a frame having two substantially parallel side bars, a longitudinal bar substantially parallel to the side bars and a rear bar substantially perpendicular to the side bars and the longitudinal bar;
    tillage tools connected to the frame;
    agricultural tools connected to the frame;
    wherein the tillage tools include a disk harrow cultivator, including:
        a bifurcated angle adjustment bar wherein a first end of each piece of the adjustment bar is adjustably connected to the longitudinal bar, and wherein a second end of each piece of the adjustment bar protrudes through a respective side bar; and
        a plurality of disks connected to the adjustment bar.

2. The device as claimed in claim 1, wherein the bifurcated angle can be adjusted along the longitudinal bar.

3. The device as claimed in claim 1, wherein the tillage tools include a plow cultivator including:

a height adjustment bar connected to the rear bar;

at least one tine connected to the height adjustment bar; and plow heads respectively connected to the tines.

4. The device as claimed in claim 1, wherein the agricultural tools include a compactor including:

arms connected to the frame;

a roller rotatably connected to the arms; and at least one resilient member connected to the arms and the frame.

5. The device as claimed in claim 1 further comprising an adjustable hitch attachment.

6. The device as claimed in claim 5, wherein the hitch attachment is a three point hitch.

7. The device as claimed in claim 1 further including adjustable height device connected to the frame the device adapted to adjust the soil depth of the tillage tools.

8. The device as claimed in claim 7, wherein the adjustable height device is a manual jack.

9. The device as claimed in claim 7, wherein the adjustable height device is a motorized jack.

10. The device as claimed in claim 1 further comprising transport wheels connected to the frame.

* * * * *